United States Patent [19]
Yallourakis

[11] 3,864,322
[45] Feb. 4, 1975

[54] PERFLUOROCARBON COPOLYMER POWDERS AND PREPARATION BY SPRAY DRYING

[75] Inventor: Michael D. Yallourakis, Wilmington, Del.

[73] Assignee: E. I. du Pont de Nemours and Company, Wilmington, Del.

[22] Filed: Apr. 12, 1973

[21] Appl. No.: 350,646

[52] U.S. Cl.............. 260/87.5 A, 117/21, 117/93.4
[51] Int. Cl.......................... C08f 15/06, C08f 29/16
[58] Field of Search............................. 260/87.5 A

[56] References Cited
UNITED STATES PATENTS
2,782,174  2/1957  Hetherington et al............. 260/29.6

*Primary Examiner*—John C. Bleutge

[57] ABSTRACT

The perfluorocarbon polymer powder coating composition consists essentially of spherical particles about 1 to 75 microns in diameter of an agglomerate of submicron particles of the perfluorocarbon polymer; the perfluorocarbon polymer preferably is a copolymer of tetrafluoroethylene and hexafluoropropylene, and the powder particles contain about 0.5 – 15 percent by weight of a nonionic surfactant such as isooctylphenoxypolyethoxy ethanol the powder is prepared by a spray drying process; this powder composition is particularly useful for electrostatic deposition on all types of metal substrates to form a durable, tough, chemical-resistant release coating that can be applied to thicknesses of 30 mils and above; the powder coating composition is particularly useful for chemical vessels, appliances, industrial equipment, high temperature ovens and the like; a process for preparing the perfluorocarbon polymer coating composition is also disclosed.

10 Claims, 2 Drawing Figures

PERFLUOROCARBON COPOLYMER POWDERS AND PREPARATION BY SPRAY DRYING

BACKGROUND OF THE INVENTION

This invention relates to a powder coating composition and in particular to a powder coating composition of a perfluorocarbon polymer.

Powder coating compositions are well known in the art and are generally prepared by grinding polymers to the desired powder size to form polymeric powders. Perfluorocarbon polymer powders have been prepared by these methods but the powder particles are not spherical and are jagged, rough, non-uniform particles which retain an electrical charge when applied by electrostatic techniques. Multiple coats of powder cannot easily be applied since the electrically charged particles of the applied coat repel the powder particles of any subsequently applied powder coating. The resulting finishes are generally rough and uneven, and attempts to apply several layers of the finish result in accentuating the roughness and unevenness of the finish. There is a great need in industry for a powder coating composition that can be electrostatically deposited in multiple coats to form a smooth and even finish.

The novel powder coating composition of this invention is of perfluorocarbon polymer particles which are an agglomeration of submicron particles that form finishes that are smooth, and even; also, finishes up to 30 mils and above in thickness can be applied with the novel powder and form an acceptable smooth finish.

SUMMARY OF THE INVENTION

The perfluorocarbon polymer powder coating composition of this invention consists essentially of spherical powder particles about 1 to 75 microns in diameter of an agglomerate of submicron particles; where the perfluorocarbon polymer is a copolymer of tetrafluoroethylene and another copolymerizable fluorinated monomer and the powder particles contain about 0.5–15 per cent by weight of a nonionic surfactant.

A process for preparing the perfluorocarbon polymer powder coating composition is also part of this invention and comprises.

1. spraying an aqueous dispersion of about 10 – 70 percent of the aforementioned perfluorocarbon polymer, which is dispersed with about 2 – 10 percent by weight of a nonionic surfactant and in which the polymer particles have a size of about 0.1 – 5.0 microns, into a chamber that contains air heated at about 100° to 250°C.; wherein the water is evaporated from the dispersion, resulting in the formation of spherical powder particles that are described above;
2. the powder particles are then removed from the chamber and preferably classified to form the novel powder coating composition.

DESCRIPTION OF THE INVENTION

Figure 1:
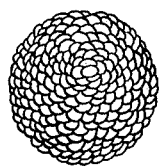
FIG. 1 illustrates the agglomerated perfluorocarbon polymer particles of the novel coating composition of this invention in which the submicron particles have agglomerated to form the spherical powder particles.

The novel powder coating composition of this invention has a powder particle size of about 1 to 75 microns in diameter and preferably 5 to 40 microns in diameter. The powder particles can be pigmented or unpigmented but usually contain about 0.1 to 5 per cent by weight of pigment. Any of the conventional inorganic pigments and heat resistant organic pigments can be used. When the powder is to be utilized as a heat resistant finish, pigments such as carbon black, titanium dioxide, iron oxide, and the like, are utilized.

The novel perfluorocarbon polymer powder coating composition of this invention is prepared by spray-drying an aqueous dispersion of the perfluorocarbon polymer. The aqueous dispersion has a polymer solids content of about 10 – 70 percent but, preferably, higher polymer solid dispersions are used in the range of 50 – 65 percent polymer solids. The dispersed perfluorocarbon polymer particles have a size of about 0.1 – 0.5 microns and, preferably, 0.13–0.26 microns. The polymer is dispersed with a 2–10 per cent by weight nonionic surfactant.

The perfluorocarbon polymer utilized is a copolymer of tetrafluoroethylene and a copolymerizable fluorinated monomer. Typical copolymers are a copolymer of tetrafluoroethylene and hexafluoropropylene, a copolymer of tetrafluoroethylene and perfluoropropyl vinyl ether, a copolymer of tetrafluoroethylene and fluorinated ethylene. One preferred copolymer is a copolymer of tetrafluoroethylene and hexafluoropropylene in a weight ratio of about 95/5 to about 50/50. More preferably, the copolymer has a weight ratio of about 95/8 to about 80/20.

Another useful copolymer is a copolymer of tetrafluoroethylene and perfluoroalkyl vinyl ether disclosed in Harris et al. U.S. Pat. No. 3,132,123, issued May 5, 1964. One particularly preferred copolymer is a 97/3 copolymer of tetrafluoroethylene/perfluoropropyl vinyl ether.

The nonionic surfactants that are used in the dispersion are alkylaryloxypolyalkyloxyalkanols in particular alkylphenoxypolyethoxy ethanols having alkyl groups of 7 to 12 carbon atoms, such as heptylphenoxypolyethoxy ethanols, octylphenoxypolyethoxy ethanols, methyl octylphenoxypolyethoxy ethanols, nonyl phenoxypolyethoxy ethanols, dodecyl phenoxypolyethoxy ethanols, and the like; polyethoxy ethanol derivatives of methylene-linked alkyl phenols; sulfur-containing agents such as those made by condensing the required proportions of ethylene oxide with nonyl, dodecyl, tetradecyl mercaptans or with alkyl thiophenols having alkyl groups of 6 to 15 carbon atoms; ethylene oxide derivatives of long-chain carboxylic acids, such as lauric acid, myristic acid, palmitic acid, oleic acid, and the like, or mixtures of these acids, such as found in tall oil; ethylene oxide condensates of long-chain alcohols, such as octyl, decyl, lauryl, cetyl alcohols, ethylene oxide derivatives of etherified or esterified polyhodroxy compounds having hydrophobic hydrocarbon chains, and the like.

One preferred nonionic surfactant is isooctylphenoxypolyethoxy ethanol. Numerous additional species of nonionic surfactants are listed in "Detergents and Emulsions" by J. W. McCutcheon, published annually by the Allured Publishing Coporation, Ridgewood, New Jersey.

The perfluorocarbon polymer coating is prepared by spray-drying the aqueous dispersion, which coalesces the dispersed polymer particles into uniformly spherical particles. The resulting polymer particles have a nonionic surfactant content of about 0.5 – 15 percent and, preferably, about 1–10 percent by weight.

In the spray-drying process, the aqueous dispersion of the perfluorocarbon polymer is sprayed into a chamber containing heated air at about 100°–250°C., which evaporates the water from the dispersion and coalesces the submicron dispersed perfluorocarbon polymer particles into the spherical powder particles and the powder particles are removed from the chamber.

Figure 2:
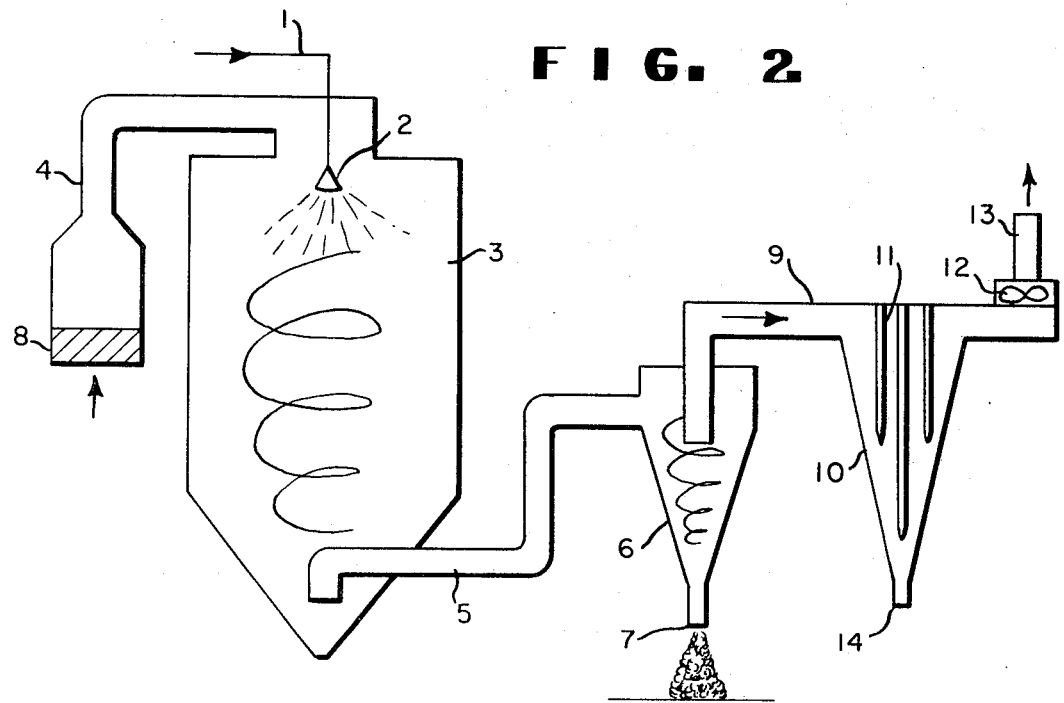
FIG. 2 illustrates the chamber into which the aqueous dispersion is sprayed to form the powder particles. An aqueous dispersion of the perfluorocarbon polymer is passed through pipe 1 and through the spray nozzle 2 and then sprayed into the chamber 3 while heated air is passed through the pipe 4 into the chamber which evaporates the water from the dispersion to form powder particles. The powder is then removed from the chamber through the pipe 5 and passed into a collector 6. The powder particles are then removed from the collector by the exit port 7.

FIG. 2 illustrates one preferred method of preparing the novel powder coating composition in which the aqueous dispersion is fed through pipe 1 and sprayed through the spray nozzle 2 into a chamber 3 containing heated air at about 200° to 255°C. at a spray rate of about 0.1 to 1.0 pounds per minute. The heated air is forced into the chamber by a fan or blower by passing the air through a filter 8 and into the pipe 4 and passes over the spray nozzle. The heated air passes through the chamber 3 in concurrent flow that is a spiral flow through the chamber. As the aqueous dispersion is sprayed into the spiral flow of air, the water is evaporated and the submicron polymer particles agglomerate to form spherical particals shown in FIG. 1. The air leaving the chamber 3 through the pipe 5 is at about 95°C. to 125°C.

The powder particles fall to the bottom of the chamber 3 and are then passed through the pipe 5 into a collector 6. The powder is removed from the collector 6 through port 7 and the powder is subsequently classified using conventional classification or screening equipment to remove any large particles to form the novel powder coating composition of this invention.

The air is then passed through pipe 9 into a second collector 10 equipped with filter bags 11 and then blown out through exit port 13. An exhaust fan 12 is used to draw the air through the system. Residual powder can be removed from the collector through port 14.

A close examination of the perfluorocarbon powder particles formed by the novel process of this invention is shown in FIG. 1, which illustrates the coalescence of the submicron particles into the spherical powder particle. It is theorized that the presence of the nonionic surfactant causes the submicron particles to coalesce. Also, the presence of the nonionic surfactant in the particle provides the powder with its uniform flow on application and causes most of the electrical charge to dissipate rapidly after the powder is applied to a substrate. These characteristics allow the novel powder composition to be applied smoothly and evenly with electrostatic deposition and to form high quality finishes on baking that have a uniform thickness and are even and smooth.

The novel powder coating composition of this invention preferably is applied by electrostatic deposition. Several layers of the powder are applied to form a coating and the coating is baked at about 225°–400°C. to coalesce the coating into a uniform finish about 0.5–1.5 mils in thickness. Subsequently layers of powder coating can then be applied and baked as above to build up the finish thickness to 30 mils and above. Generally, finishes of about 4–6 mils are used.

The novel perfluorocarbon polymer powder composition of this invention can be utilized in a variety of areas where these coatings could not previously be used because extra-thick finishes could not be applied. For example, pipes, mixing vessels, and reaction equipment subjected to abrasion can now be coated with these perfluorocarbon polymer coatings using the novel powder of this invention.

The novel powder coating composition of this invention can be utilized for a variety of purposes, such as applying release finishes, to coat industrial equipment, pipes, all types of reaction vessels which require chemical resistant coatings having good release properties, and can also be utilized as a finish for industrial equipment subjected to high temperatures, such as industrial ovens.

The following Example illustrates the invention. All parts in percentages are on a weight basis unless otherwise specified.

EXAMPLE 1

The following perfluorocarbon latices are utilized to form powder coating compositions:

Latex A

FEP-Fluorocarbon latex (55 percent polymer solids dispersed in water of a copolymer of tetrafluoroethylene/hexafluoropropylene in a weight ratio of 89/11, dispersed in water with 6 percent by weight isooctylphenoxyethoxy ethanol).

Latex B

FEP-Fluorocarbon latex (15 percent polymer solids of the above copolymer dispersed in water with 0.5 percent by weight of eight-carbon atom fluorinated acids).

Latex C

FEP-Fluorocarbon polymer latex (15 per cent polymer solids dispersed in water of the above-described copolymer dispersed with 6 percent by weight of isooctylphenoxypolyethoxy ethanol).

Each of the latices A, B, and C are spray-dried under the following conditions, using the equipment described in the specification and shown in FIG. 2. The inlet temperature of the air is 205°C. and the outlet temperature of the air is 95°C., and a feed rate of 0.7 pounds per minute of the latex for the spray is used. The powder is then collected and passed through a sieve to remove any large agglomerates to form a powder coating composition.

The following powders were formed from each of the latices:

Latex A

A powder of spherical particles having a size of about 23 microns formed from an agglomeration of the submicron particles of the dispersion and is a free-flowing powder which does not adhere to the walls of the container and is easily handled and applied by electrostatic deposition techniques.

Latex B

A powder of irregularly shaped agglomerates having a particle size of about 15 microns; the powder sticks to the container walls and is difficult to handle, is not free flowing, and is not easily applied by electrostatic deposition techniques.

Latex C

The properties are very similar to the powder separated from Latex A.

Each of the above-prepared powders is applied to separate aluminum panels using a DeVilbiss electrostatic powder gun type EHP-501, using 30 kilovolts of electricity, a main air supply at 80 pounds per square inch gauge, a Vortex air pressure of 40 pounds per square inch, and a feed air pressure of 20 pounds per square inch and the spraying is done at 12-18 in. distance from the panel.

The powder from Latex A is easily sprayed onto the aluminum plate to a thickness of 1 mil and is then baked at 330°C. for 30 minutes, providing a smooth and even coating. The substrate is recoated and baked as above until a 5 mil thick layer of the coating is formed. The coating is smooth and even and has a good appearance.

The polymer coating from Latex B is very difficult to spray. After the first layer of powder is applied to the substrate, the second layer is repulsed by the first layer, and, it is extremely difficult to build up the coating to any significant thickness. A 1 mil thick coating of the powder is applied and is baked as above, which resulted in a film which was rough and uneven. It was extremely difficult to obtain a coating of 5 mils thickness, and when this coating was obtained after multiple layers and baking between each layer, the resulting coating was extremely rough and uneven, and it generally had an unacceptable appearance. It is theorized that the irregular shapes of the powder particles make application of the powder extremely difficult and the absence of the nonionic surfactant allows the particles to maintain an electrical charge after application, which results in repulsion of additional powder particles. The presence of the nonionic surfactant, as in the powder prepared from Latex A, allows the electrical charge to dissipate so that repulsion of any additional powder that is sprayed on the panel is eliminated.

The powder from Latex C is applied as above and a 5 mil thick coating is formed as above. The resulting coating is very similar to the powder coating prepared from Latex A.

The invention claimed is:

1. A perfluorocarbon polymer coating composition consisting essentially of spherical powder particles of about 1 to 75 microns in diameter of an agglomerate of submicron particles of the perfluorocarbon polymer wherein the perfluorocarbon polymer is a copolymer of tetrafluoroethylene and another copolymerizable fluorinated monomer and the powder contains about 0.5-15 per cent by weight of a nonionic surfactant.

2. The powder coating composition of claim 1 in which the perfluorocarbon polymer is selected from the group consisting of a copolymer of tetrafluoroethylene and hexafluoropropylene and a copolymer of tetrafluoroethylene and perfluoropropylvinyl ether.

3. The power coating composition of claim 2 in which the perfluorocarbon polymer is a copolymer of tetrafluoroethylene and hexafluoropropylene in a weight ratio of about 95/5 to about 50/50.

4. The powder coating composition of claim 2 in which the perfluorocarbon polymer is a copolymer of tetrafluoroethylene and hexafluoropropylene in a weight ratio of about 92/8 to about 80/20.

5. The powder coating composition of claim 4 in which the nonionic surfactant is an alkylaryloxypolyalkyloxyalkanol.

6. The powder coating composition of claim 5 in which the nonionic surfactant is isooctylphenoxypolyethoxy ethanol.

7. The powder coating composition of claim 1 in which the spherical powder particles have a diameter of about 5 to 40 microns and the perfluorocarbon polymer is a copolymer of tetrafluoroethylene and hexafluoropropylene in a weight ratio of about 92/8 to about 80/20 and contains about 1 - 10 percent by weight of a nonionic surfactant of isooctylphenoxypolyethoxy ethanol.

8. A process for preparing a perfluorocarbon polymer powder coating composition of claim 1 which comprises:

a. spraying an aqueous dispersion of 10-70 percent polymer solids of a perfluorocarbon polymer of tetrafluoroethylene and another copolymerizable fluorinated monomer dispersed with about 2-10 per cent by weight of a nonionic surfactant and wherein the dispersed polymer particles have a size of about 0.1-0.5 microns into a chamber having a concurrent spiral air flow in which the air entering the chamber is at a temperature of about 200°-255°C. and the air leaving the chamber is at an outlet temperature of about 95°-125°C.; whereby the water is evaporated from the dispersion resulting in the formation of spherical powder particles about 1 to 75 microns in diameter which are an agglomeration of submicron perfluorocarbon particles;

b. removing the powder particles from the chamber.

9. The process of claim 8 in which the aqueous dispersion has a 50 to 65 percent polymer solids content of a perfluorocarbon polymer of tetrafluoroethylene and hexafluoropropylene in a weight ratio of 92/8 to 80/20 and in which the nonionic surfactant is an alkylaryloxypolyalkyloxyalkanol.

10. The process of claim 9 in which the nonionic surfactant is isooctylphenoxypolyethoxy ethanol.

* * * * *